US012435696B2

(12) United States Patent
Vcelka et al.

(10) Patent No.: US 12,435,696 B2
(45) Date of Patent: Oct. 7, 2025

(54) NACELLE FOR A WIND TURBINE

(71) Applicant: Vestas Wind Systems A/S, Aarhus N. (DK)

(72) Inventors: Martin Patrick Vcelka, Gjern (DK); Gopi Vellore Babu, Chennai (IN)

(73) Assignee: Vestas Wind Systems A/S, Aarhus N. (DK)

(*) Notice: Subject to any disclaimer, the term of this patent is extended or adjusted under 35 U.S.C. 154(b) by 0 days.

(21) Appl. No.: 18/842,227

(22) PCT Filed: Feb. 23, 2023

(86) PCT No.: PCT/DK2023/050031
§ 371 (c)(1),
(2) Date: Aug. 28, 2024

(87) PCT Pub. No.: WO2023/165666
PCT Pub. Date: Sep. 7, 2023

(65) Prior Publication Data
US 2025/0179988 A1   Jun. 5, 2025

(30) Foreign Application Priority Data

Mar. 4, 2022 (IN) ............................. 202211011730
Apr. 20, 2022 (DK) ......................... PA 2022 70205

(51) Int. Cl.
*F03D 1/00* (2006.01)
*F03D 13/40* (2016.01)

(52) U.S. Cl.
CPC ........... *F03D 1/165* (2023.08); *F03D 13/403* (2023.08); *F05B 2240/14* (2013.01); *F05B 2250/26* (2013.01); *F05B 2260/02* (2013.01)

(58) Field of Classification Search
CPC ....... F03D 11/101; F03D 1/165; F03D 13/403
See application file for complete search history.

(56) References Cited

U.S. PATENT DOCUMENTS

2024/0102445 A1* 3/2024 Christiansen ........... F03D 1/101

FOREIGN PATENT DOCUMENTS

| EP | 2325482 A1 | 5/2011 |
|----|-----------|--------|
| EP | 2325485 A1 | 5/2011 |
| EP | 2395233 A2 | 12/2011 |
| EP | 3242014 A1 | 11/2017 |
| EP | 3399185 A1 | 11/2018 |

(Continued)

OTHER PUBLICATIONS

Danish Patent and Trademark Office, examination report issued in corresponding DK Application No. PA 2022 70205, dated Oct. 4, 2022.

(Continued)

*Primary Examiner* — Sabbir Hasan
(74) *Attorney, Agent, or Firm* — Wood Herron & Evans LLP

(57) ABSTRACT

The invention relates to a wind turbine nacelle (2, 40) configured for mounting on a wind turbine tower (3), the nacelle comprising a top cover comprising multiple cover elements (41, 42, 43, 44), of which at least one is a dome cover element (44) comprising a dome-shaped part (45); wherein said nacelle has a second configuration in which said dome-shaped part (45) protrudes upwards and a first configuration in which said dome-shaped part (45) protrudes downwards.

13 Claims, 4 Drawing Sheets

(56) References Cited

FOREIGN PATENT DOCUMENTS

| WO | 2012060370 A1 | 5/2012 |
| WO | WO-2020200710 A1 * | 10/2020 |
| WO | 2021103603 A1 | 6/2021 |

OTHER PUBLICATIONS

International Searching Authority, International Search Report and Written Opinion issued in corresponding PCT Application No. PCT/DK2023/050031, dated May 30, 2023.

* cited by examiner

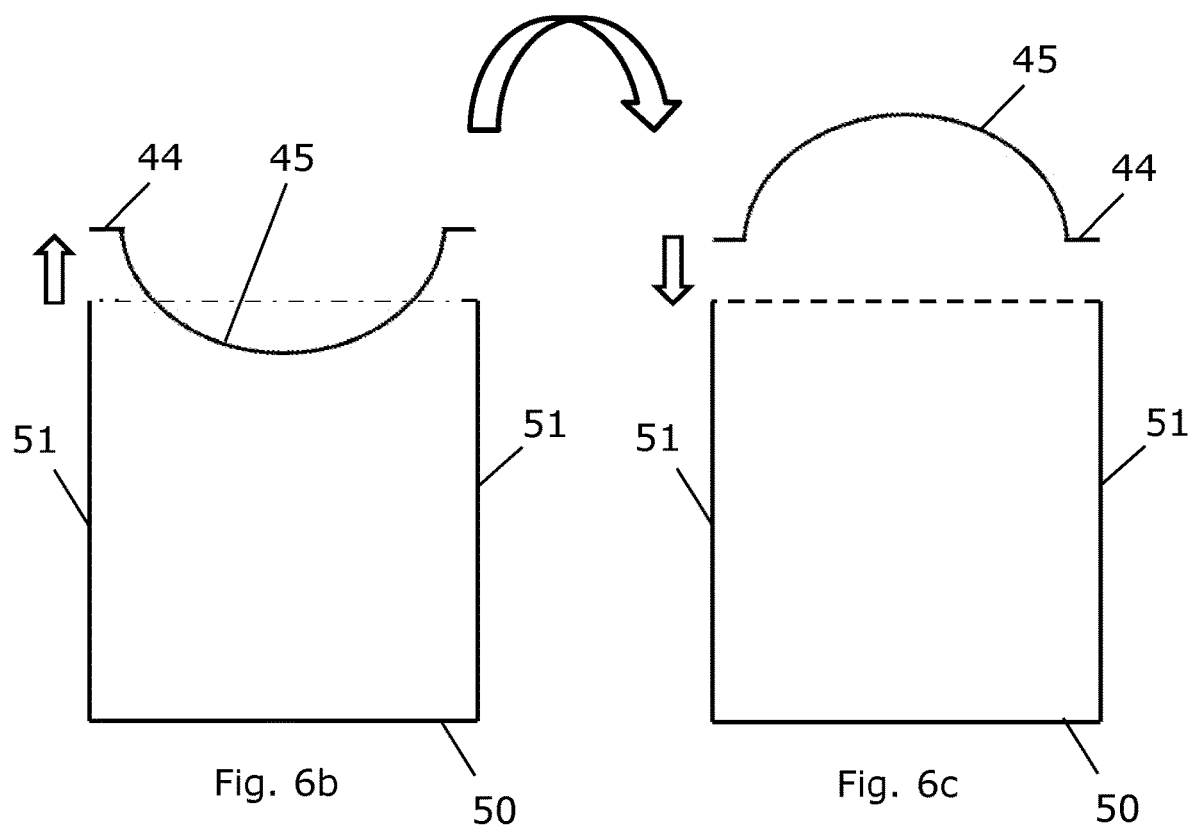
Fig. 6b
Fig. 6c
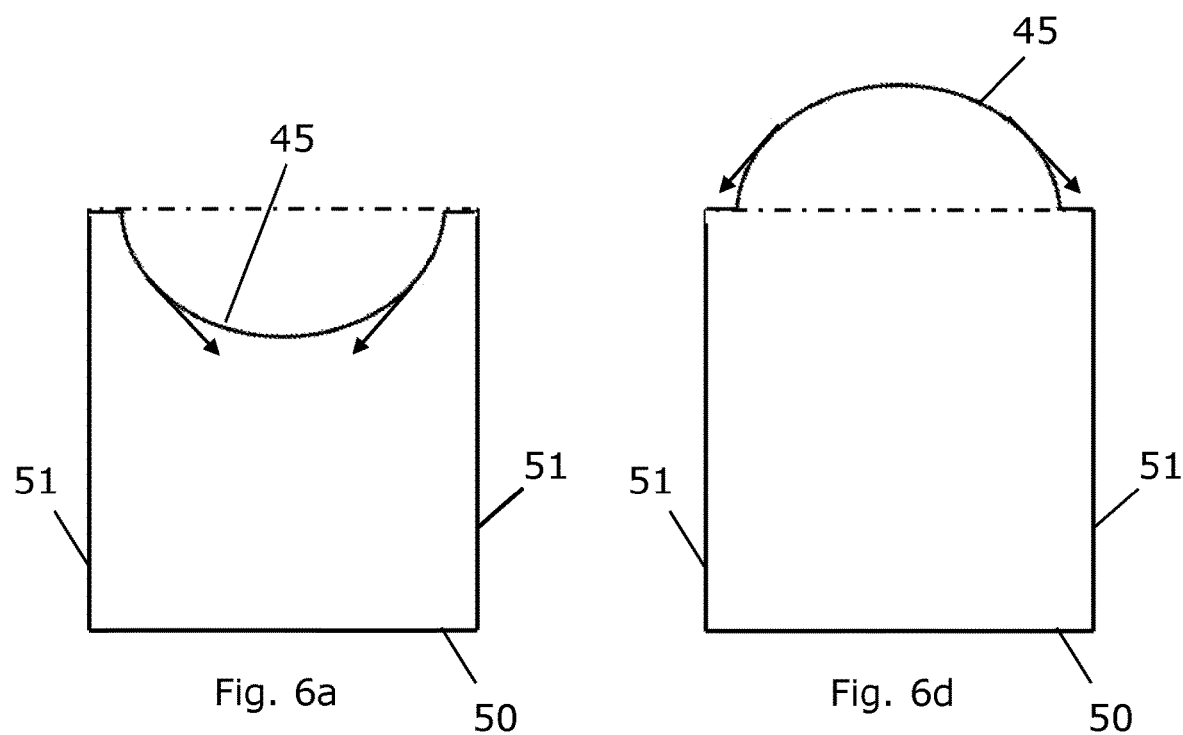
Fig. 6a
Fig. 6d

NACELLE FOR A WIND TURBINE

INTRODUCTION

The present invention relates to a nacelle for a wind turbine, the nacelle comprising a transportation configuration and an assembled configuration. The invention further relates to a transport method for such a nacelle.

BACKGROUND

Transportation of large elements on a truck requires special transport equipment in order to adjust the truck to suit the particular element to be transported. Furthermore, national regulations of a country or a state may require that the transport does not exceed a certain height or a certain weight.

In many countries in Europe and in USA, a certain overall height has been specified which a truck including an element may not exceed. In order to comply with these regulations, special transport equipment enabling the element to be transported on a platform lowered down between a front part of a truck and a rear part of a truck may be required.

Such transport limits have driven nacelle designs such as shown in EP2409027A1, in which the full nacelle roof can be changed between a high and a low configuration.

In another prior art solution in which a part of the roof protrudes higher than the overall level, as seen for instance in WO2020200710A1, that higher part may be removed and transported separately or placed inside the nacelle during transportation.

An object of the present invention is, at least partly, to overcome the above disadvantages and drawbacks of the prior art and to provide an improved nacelle for a wind turbine which provides benefits in relation to transport.

SUMMARY

The above object, together with numerous other objects, advantages, and features, which will become evident from the below description, is accomplished by a solution in accordance with the present invention by a wind turbine nacelle configured for mounting on a wind turbine tower, the nacelle comprising a top cover comprising multiple cover elements, of which at least one is a dome cover element comprising a dome-shaped part; wherein said nacelle has a first configuration in which said dome-shaped part protrudes downwards and a second configuration in which said dome-shaped part protrudes upwards.

With the present invention, a single dome cover element serves a double purpose. It serves the standard desired purpose when in an assembled configuration, but as it is designed to be able to be rotated 180° and still cope with all forces acting on it and still be fitting with the relevant interfaces on the remaining part of the nacelle, then it also serves as a transport cover during transport. Hereby, the full nacelle can be transported within the required transport envelope without a separate dome cover element requiring a separate transport or taking up space inside the nacelle. Furthermore, a separate transport cover can be avoided, which may otherwise be necessary to ship back or dispose.

It is worth emphasizing that a dome cover element, as all elements in wind turbines, is optimized for the intended purpose. Therefore, any prior art dome cover element would not be suitable for the purpose by mere rotation. Extra stiffening in certain places is required to ensure that the curvature can be the other way around and furthermore, the edges of the dome cover element need to be able to fit the remaining part of the nacelle in both configurations.

In an embodiment of the invention, said first configuration is a transportation configuration with a first height of said wind turbine nacelle, and said second configuration is an assembled configuration with a second height of said wind turbine nacelle, the second height being higher than the first height.

In an embodiment of the invention, said dome cover element comprises at least three linear edges. In order to be able to mount the dome cover element both upwards and downwards without too much hassle, the three edges (excluding the front edge) are preferably linear.

In an embodiment of the invention, said dome cover element comprises at least one drain hole. When the dome cover element protrudes downwards, rainwater will be collected, which is not an issue when the dome cover element protrudes upwards. Therefore, it is preferred to include a drain hole in the dome cover element at the extreme protrusion.

In an embodiment of the invention, said nacelle comprises sealing means adapted for sealing said dome cover element in both first and second configurations. Typically for cover elements, sealing means may be mounted on the lower side of such; however, if this is done on the dome cover element, there would be no sealing means when the dome cover element protrudes upwards. Therefore, it is preferred to include sealing means suitable for both configurations. This could for example be provided by sealing means on both upper and lower side of the dome cover element, or it could be provided by sealing means on the mating element, which is in the same position for both configurations. Hereby, a waterproof connection may be established.

In an embodiment of the invention, said dome cover element comprises fiberglass or steel.

In an embodiment of the invention, said wind turbine nacelle further comprises a lower cover part having a bottom cover and two opposite side covers defining a space and a width of the bottom cover part.

In an embodiment of the invention, each of said multiple cover elements comprises at least one flange for connecting to another of said multiple cover elements.

In an embodiment of the invention, the height of said wind turbine nacelle in said first configuration is equal to or lower than 4 m, preferably 3.9 m, more preferably 3.3 m. Thus, the maximum height of the nacelle during transport complies with the maximum height for passing under bridges and through tunnels etc. specified by a number of European countries and in USA.

In an embodiment of the invention, the height of said dome cover element is at least 10 cm, such as at least 20 cm or at least 50 cm.

In an embodiment of the invention, said wind turbine nacelle comprises:
- a main unit arranged to be connected to the wind turbine tower and adapted for housing the rotor-supporting assembly, and
- at least one auxiliary unit for example housing an operative component forming part of the power conversion assembly, wherein the main unit and the auxiliary unit are separate units configured to be connected by a unit fixation structure at an interface,
wherein said main unit comprises said top cover comprising multiple cover elements, of which at least one is a dome cover element comprising a dome-shaped part.

In an embodiment of the invention, said nacelle comprises a main unit and at least two auxiliary units. In an embodiment of the invention, the main unit and the at least one auxiliary unit are arranged side by side in a direction away from a rotational axis defined by the rotor-supporting assembly.

In an embodiment of the invention, said wind turbine nacelle houses a rotor-supporting assembly for supporting a hub. In an embodiment of the invention, said wind turbine nacelle houses a power conversion assembly.

Furthermore, the invention relates to a reconfiguration method for the wind turbine nacelle, the method comprising the steps of:
 providing a nacelle in a first configuration in which said dome-shaped part protrudes downwards or a second configuration in which said dome-shaped part protrudes upwards;
 shifting the configuration to the other of said first configuration and said second configuration.

BRIEF DESCRIPTION OF THE DRAWINGS

In the following, embodiments of the disclosure will be described in further details with reference to the accompanying schematic drawings which, for the purpose of illustration, show some non-limiting embodiments and in which:

FIGS. 6a-6d schematically show the method of changing from one configuration to the other.

DETAILED DESCRIPTION OF INVENTION

The detailed description and specific examples, while indicating embodiments, are given by way of illustration only, since various changes and modifications will become apparent to those skilled in the art from this detailed description.

Figure 1:
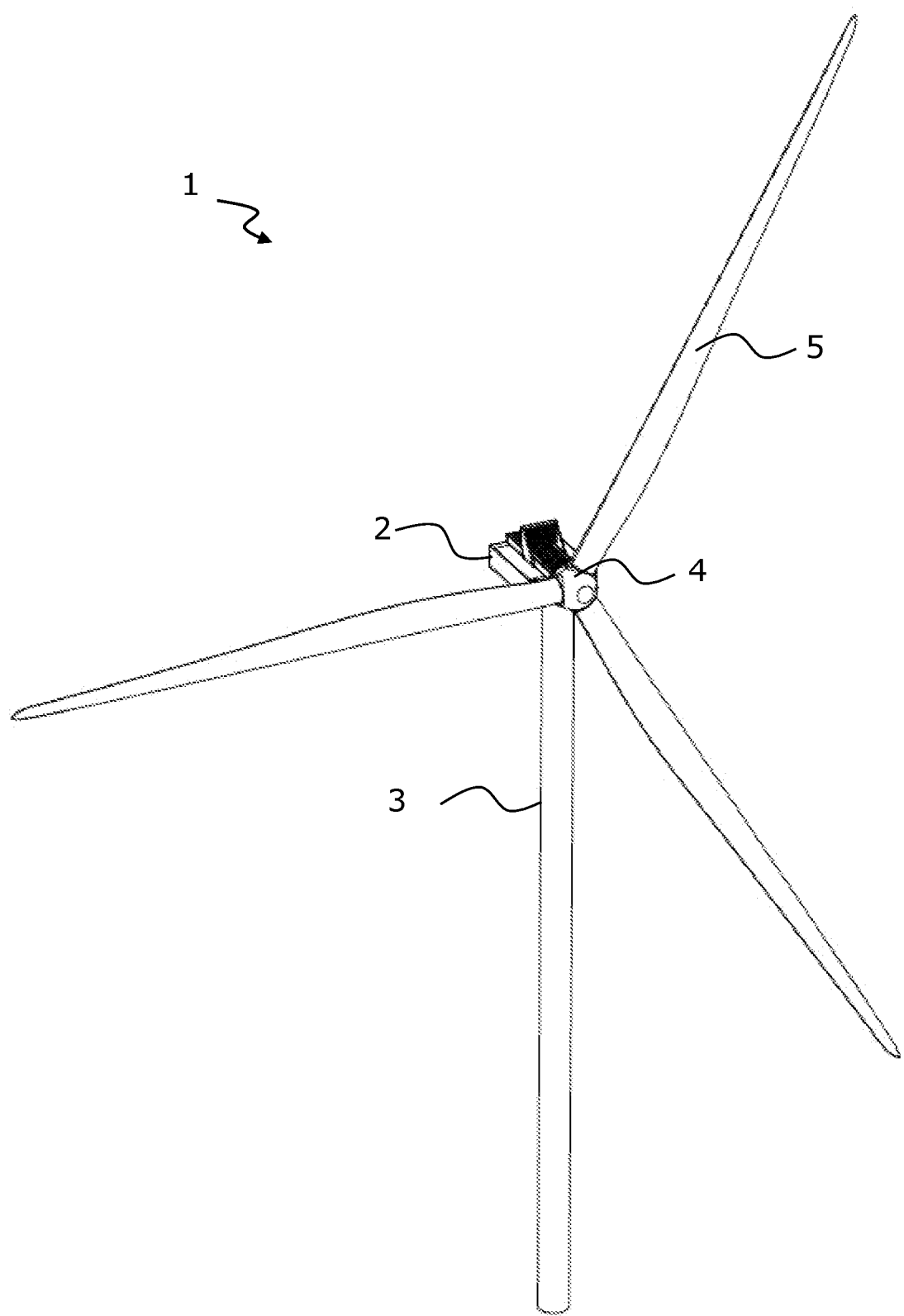
FIG. 1 shows a wind turbine.

FIG. 1 illustrates a wind turbine 1 with a nacelle 2 mounted on a tower 3. A hub 4 (hereafter, hub is used to refer to hub in itself or hub and spinner for those wind turbines, where there is a spinner surrounding the hub) carrying three rotor blades 5 forms a rotor and is carried by a rotor-supporting assembly in the nacelle 2. The hub with rotor blades is always turned to face the wind and the turning movement is performed in a yaw of the bottom of the nacelle in the connection with the tower. Typically, the rotor-supporting assembly comprises a rotor shaft connecting a gear arrangement and a generator to the hub.

Figure 2:
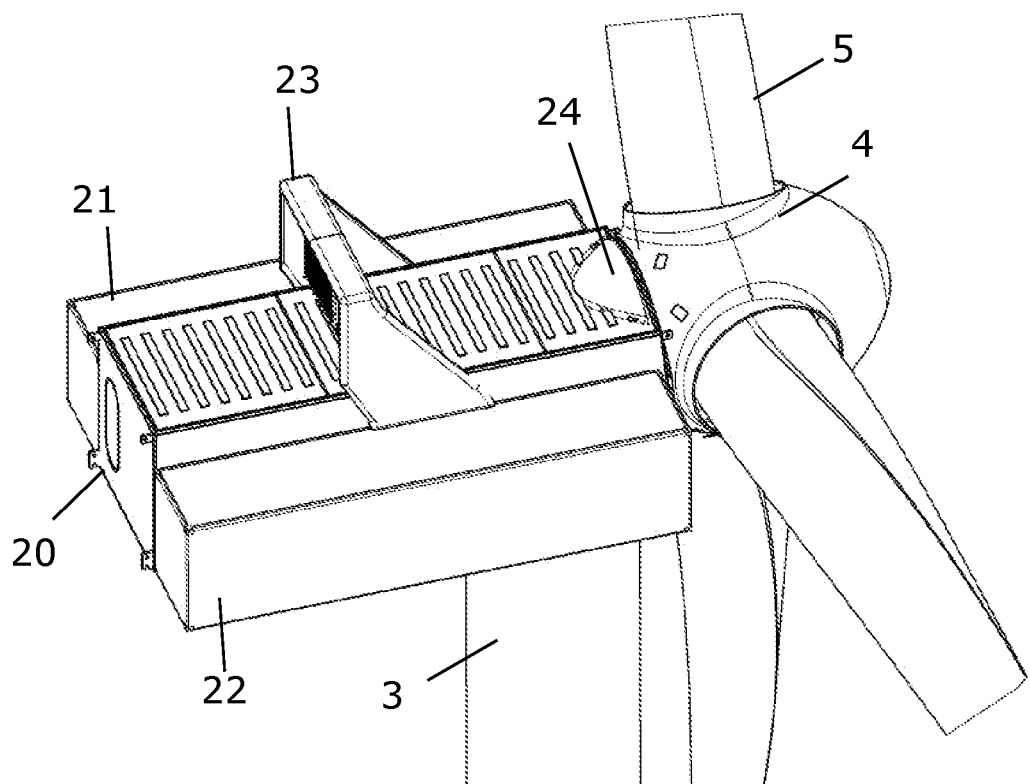
FIG. 2 shows a nacelle of a wind turbine.

FIG. 2 illustrates that the nacelle in a second embodiment comprises a main unit 20 and two auxiliary units 21, 22. A cooling area 23 is arranged on top of the nacelle. The cooling area is formed by a heat exchanger which may form part of the main unit, and/or any of the auxiliary units. The main unit 20 is mounted on the tower 3 via a yawing arrangement (not shown), allowing the nacelle 2 to rotate in order to direct the rotor into the wind.

Figure 3:
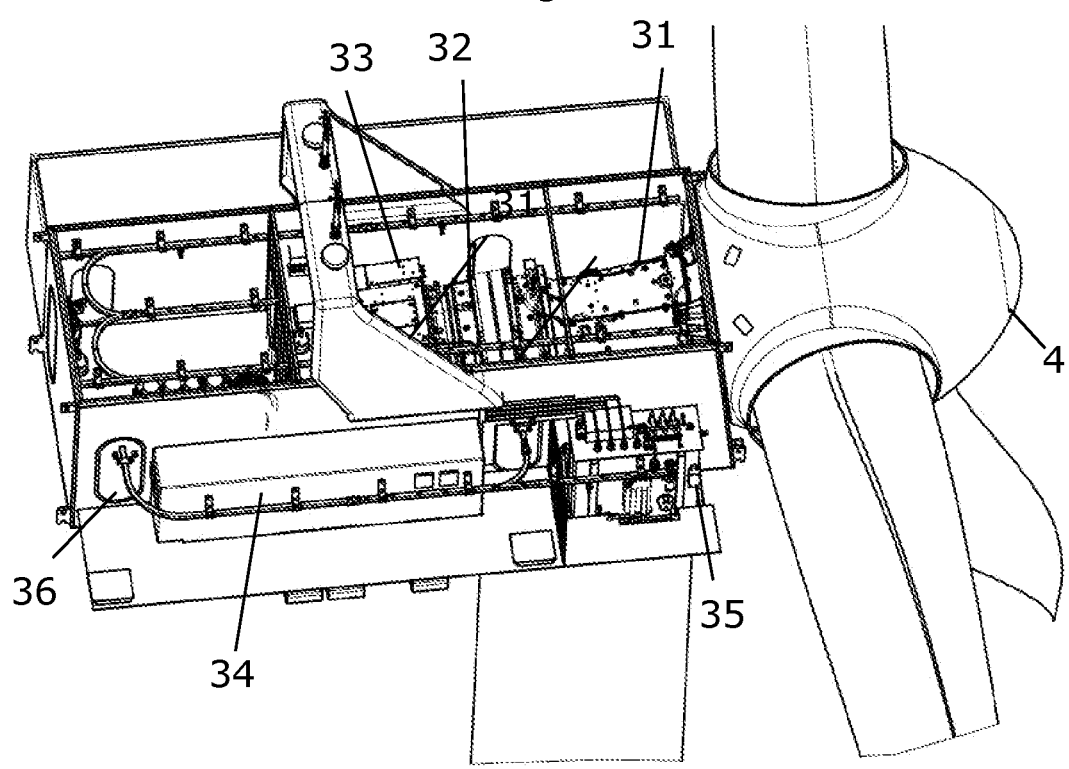
FIG. 3 shows a perspective view of the nacelle of FIG. 2.

FIG. 3 illustrates a perspective view of the nacelle 2 of FIG. 2. In FIG. 3 the outer walls of the nacelle 2 are (for the sake of explanation) transparent, thereby revealing the interior parts of the nacelle 2 and the wind turbine components accommodated therein. The main unit 20 accommodates a main bearing unit 31 supporting a main shaft for rotation therein, a gear arrangement 32 and a generator 33, arranged sequentially behind the hub 4, along a direction defined by the rotational axis of the hub 4. The components in the main unit primarily form part of the drivetrain.

It can be seen from the position of the main bearing unit 31 that the rotational axis of the hub 4 is slightly inclined relative to horizontal. This in combination with the hub having a large diameter compared to front side of the main unit 20 results in a dome shape 24 being required on the upper side of the main unit.

The auxiliary unit 22 accommodates a transformer unit 34, and a converter unit 35 which herein constitute two different operative components being accommodated in the auxiliary unit but carried by the main unit. In alternative embodiments, the operative component could be a power conversion assembly such as an electrolysis cell stack, a battery.

Each auxiliary unit 21, 22 is mounted along a side of the main unit 20 by a unit fixation structure. In the disclosed embodiment, they are mounted in such a manner that one auxiliary unit 21 is mounted along a right side of the main unit 20 and the other auxiliary unit 22 is mounted along a left side of the main unit 20, as seen in a direction along a rotational axis of the hub 4 from the hub 4 towards a rear wall of the main unit 20.

Figure 4:
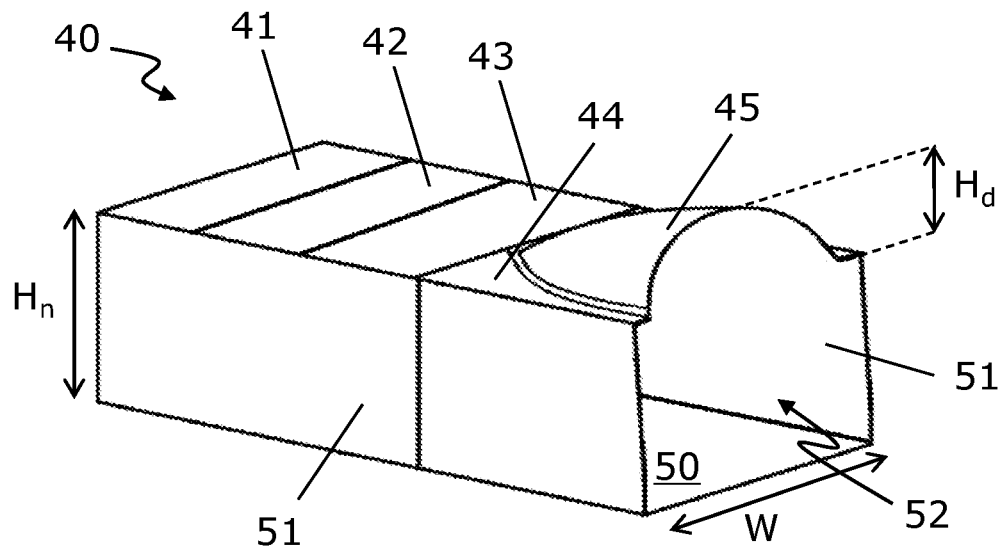
FIG. 4 shows a nacelle of a wind turbine in a second configuration.

FIG. 4 shows a schematic view of a nacelle 20,40 of a more traditional type of wind turbine, where a single nacelle contains all elements needed without additional auxiliary units. The invention will now be further described with reference to a nacelle of this type.

The nacelle 40 usually has a cover in order to protect the interior parts of the nacelle. The cover may comprise elements attached to an internal frame or be a self-supporting construction carrying its own weight.

In an embodiment of the present invention, the nacelle 40 has a top cover comprising of multiple cover elements. Cover elements 41, 42, and 43 may or may not be identical, but most importantly dome cover element 44 comprises a dome-shaped part 45 with the dome-shaped part protruding upwards.

Further, the nacelle has a lower cover part having a bottom cover 50 and two opposite side covers 51 defining a space 52 and a width W of the bottom cover part.

Figure 5:
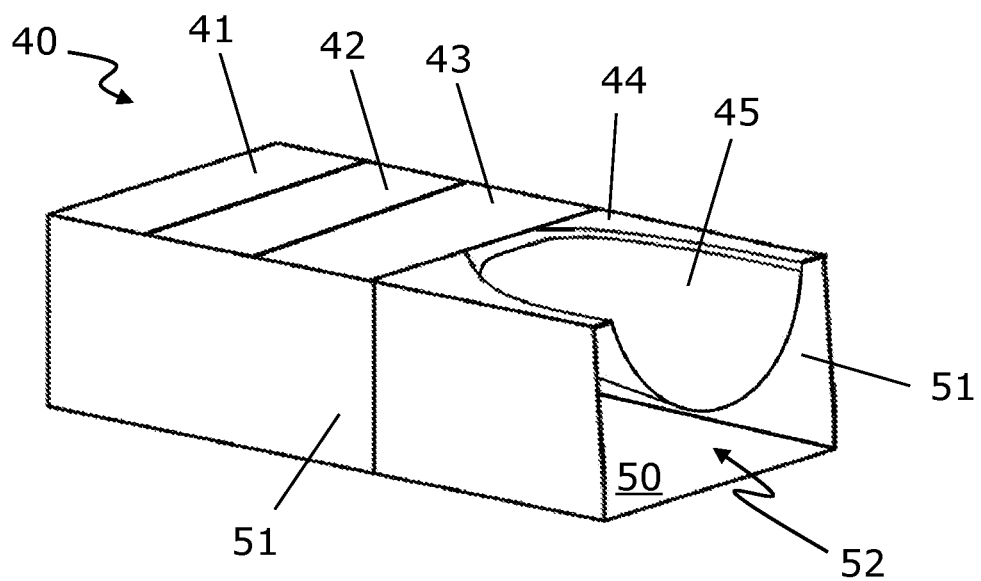
FIG. 5 shows a nacelle of a wind turbine in a first configuration.

FIG. 5 shows a schematic view of the nacelle of FIG. 4, in which the dome cover element 44 is in a first configuration in which said dome-shaped part 45 protrudes downwards, i.e. a transportation configuration. This is opposed to the assembled configuration as in FIG. 4. In this transportation configuration, the dome-shaped part 45 is within the space 52 of the lower cover part so that the overall height of the nacelle is reduced to comply with the transport restrictions in e.g. Europe and USA. As shown, the height of the nacelle in the assembled configuration is $H_n$ and in the transportation configuration, the height is $H_n+H_d$.

In prior art solutions where a higher part is removed and transported separately or placed inside the nacelle during transportation, the removal of the higher part creates an opening in the nacelle roof. This opening will be subject to rain and dirt whirled around during transport entering the interior of the nacelle unless covered somehow. For this reason, typically a tarpaulin is used to cover the opening.

In some prior art, such tarpaulin can only be used once as it will suffer too much damage during transport, and has to be discarded. In other cases, such tarpaulin is strengthened markedly but then has to be shipped back from site after the dome roof is installed to be reused.

Consequently, as the dome cover element 44 will cover the opening in the nacelle during transport, thus closing off the interior of the nacelle and further making a tarpaulin expendable, the present invention is advantageous both in relation to saving costs and being environmentally friendly.

FIGS. 6a-6d schematically show the method of changing from one configuration to the other of the wind turbine nacelle. FIG. 6a shows the nacelle in a first configuration (transport configuration), FIG. 6b shows the dome cover element 44 comprising the dome-shaped part 45 being lifted. Between FIGS. 6b and 6c, the dome cover element 44 is rotated 180°, and FIG. 6c then shows the dome cover element 44 comprising the dome-shaped part 45 being lowered. Finally, in FIG. 6d the nacelle is in a second configuration (assembled configuration).

With small arrows in FIGS. 6a and 6d are indicated very roughly approximate force vectors of how gravity will influence the dome-shaped part 45. Clearly the forces acting on it will be different between the two configurations. Therefore, it is required to design the dome cover element 44 including the dome-shaped part 45 such that it can handle the forces acting on it both in the upwards and downwards configurations. This can be done through additional stiffening in the right places of the dome cover element 44.

As mentioned, in some prior art a higher part may be transported inside of the nacelle to avoid double transport costs. However, if so the higher part will take up space inside the nacelle. With the present invention, the main part of the space inside the nacelle is available for other purposes.

When herein the term "dome-shaped" is used, it is to be understood as the dome cover element having a part protruding from a generally flat upper surface to establish a generally smooth transition between the upper surface of the nacelle and the rotor as seen for example in FIG. 2. This protruding part may typically be in the shape of a dome (rounded), but it may also be protruding in other shapes, such as a wedge-shaped element having the higher end towards the rotor.

Although the invention has been described above in connection with preferred embodiments of the invention, it will be evident for a person skilled in the art that several modifications are conceivable without departing from the invention as defined by the following claims.

The invention claimed is:

1. A wind turbine nacelle configured for mounting on a wind turbine tower, the nacelle comprising:
   a top cover comprising multiple cover elements, of which at least one is a dome cover element comprising a dome-shaped part;
   wherein said nacelle has a first configuration in which said dome-shaped part protrudes downwards and a second configuration in which said dome-shaped part protrudes upwards.

2. The nacelle according to claim 1, wherein said first configuration is a transportation configuration with a first height of said wind turbine nacelle, and said second configuration is an assembled configuration with a second height of said wind turbine nacelle, the second height being higher than the first height.

3. The nacelle according to claim 1, wherein said dome cover element comprises at least three linear edges.

4. The nacelle according to claim 1, wherein said dome cover element comprises fiberglass or steel.

5. The nacelle according to claim 1, wherein said wind turbine nacelle further comprises a lower cover part having a bottom cover and two opposite side covers defining a space and a width (W) of the bottom cover part.

6. The nacelle according to claim 1, wherein the height ($H_n$) of said wind turbine nacelle in said first configuration is equal to or lower than 4 m.

7. The nacelle according to claim 1, wherein the height ($H_d$) of said dome cover element is at least 10 cm.

8. The nacelle according to claim 1, wherein said wind turbine nacelle comprises:
   a main unit arranged to be connected to the wind turbine tower and adapted for housing the rotor-supporting assembly, and
   at least one auxiliary unit housing an operative component forming part of the power conversion assembly,
   wherein the main unit and the at least one auxiliary unit are separate units configured to be connected at an interface, and
   wherein said main unit comprises said top cover comprising the multiple cover elements, of which at least one is the dome cover element comprising the dome-shaped part.

9. The nacelle according to claim 8, wherein the main unit and the at least one auxiliary unit are arranged side by side in a direction away from a rotational axis defined by the rotor-supporting assembly.

10. The nacelle according to claim 1, wherein said nacelle comprises a main unit and at least two auxiliary units.

11. The nacelle according to claim 1, wherein said wind turbine nacelle houses a rotor-supporting assembly for supporting a hub.

12. The nacelle according to claim 1, wherein said wind turbine nacelle houses a power conversion assembly.

13. A reconfiguration method for the wind turbine nacelle according to claim 1, the method comprising the steps of:
   providing a nacelle in a first configuration in which said dome-shaped part protrudes downwards or a second configuration in which said dome-shaped part protrudes upwards; and
   shifting the configuration to the other of said first configuration and said second configuration.

* * * * *

UNITED STATES PATENT AND TRADEMARK OFFICE
CERTIFICATE OF CORRECTION

PATENT NO. : 12,435,696 B2  
APPLICATION NO. : 18/842227  
DATED : October 7, 2025  
INVENTOR(S) : Martin Patrick Vcelka et al.

Page 1 of 1

It is certified that error appears in the above-identified patent and that said Letters Patent is hereby corrected as shown below:

In the Specification

Column 4, Line 37, change comprising of multiple to --comprising multiple--.

Signed and Sealed this  
Sixth Day of January, 2026

John A. Squires  
*Director of the United States Patent and Trademark Office*